UNITED STATES PATENT OFFICE 2,262,466

STABILIZED PETROLEUM DISTILLATE

John W. Orelup, Short Hills, N. J.

No Drawing. Application May 31, 1938,
Serial No. 211,046

3 Claims. (Cl. 44—9)

The present invention relates to improvements in the art of stabilizing gasoline and other petroleum distillates and is a continuation in part of my copending application Serial No. 613,788, filed May 26, 1932. It is well known that, generally speaking, present day commercial gasoline is unstable to light and to prolonged standing in the absence of light. When exposed to light or to standing for prolonged periods, such gasolines darken in color and deposit gum. Frequently storage periods range from six months to two years. Furthermore, this instability of gasoline is a particular hindrance when it is sought to incorporate into gasoline other substances, as for example either for coloring purposes or for increasing the anti-knock value of gasoline, since the formation of the gum-like substances in gasoline acts to precipitate out these various added agents.

The invention accordingly has for its principal object to provide a relatively stable cracked gasoline as well as a relatively stable mixture of gasoline with other ingredients such as coloring materials and particularly anti-knock agents such as tetraethyl lead. To this end the invention is concerned with the discovery of improved stabilizing agents which, when added to gasoline or a gasoline mixture as specified, will impart to it a desired property of stability.

In recent years, the coloring of gasoline has assumed considerable importance in the industry, the object of such coloring being both to identify particular brands and also to afford some protection against the effect of light. The use of my improved stabilizers is further of value for the reason that these agents themselves possess strong fluorescent properties which in combination with true coloring materials produce many distinctive color effects in gasoline. Such fluorescent properties are also useful when no other coloring material is present, since they mask the objectionable natural color of many cracked gasolines.

The use of organic metal compounds as anti-knock agents, particularly tetraethyl lead, has now become widespread. With many gasolines, particularly those of the cracked variety, it is a difficult matter to keep the tetraethyl lead or other metallic compound in solution, particularly when the gasoline so treated is exposed to light as occurs in the so-called visible dispensing pumps or when the treated gasoline is subjected to prolonged standing in the absence of light. However, by the use of my improved stabilizers, this precipitating or decomposing tendency is arrested and the availability of tetraethyl lead and other organic metallic compounds for other gasolines is thereby greatly increased.

My improved stabilizers may be generally described as oxides of dinaphthyls containing one or more oxygen atoms and thus far I have found the following known members of this class of compounds to be of great efficacy:

Binaphthalene oxide

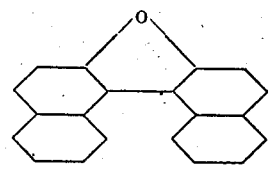

including also the iso compound

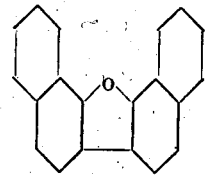

Binaphthalene dioxide

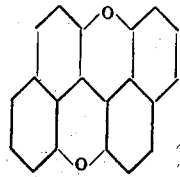

Binaphthalene oxide is a good stabilizer against light and furthermore has fluorescent properties which are valuable in masking an undesirable color and also in enhancing the appearance of artificially colored fuels. One method of preparing it is to heat beta-binaphthol to a high temperature with phosphorous oxychloride.

Iso binaphthalene oxide has stabilizing and fluorescent properties comparable to that of the normal compound. It may be prepared by passing oxygen or air over a heated mixture of beta naphthol and a catalyst such as calcium oxide.

Binaphthalene dioxide is also both a stabilizer and a fluorescence producing substance. The color imparted by the substance, however, is somewhat less desirable for gasoline but more desirable for oil. Binaphthalene dioxide can be formed by heating beta-binaphthol with copper oxide and nitrobenzol as oxidizing agents.

Binaphthalene oxide and its iso compound appear to possess the optimum stabilizing and flurescent properties. The dioxide compound is also a good stabilizer but its fluorescence is less desirable in gasoline. It is therefore evident that not only is each one of these substances valuable per se but mixtures of them are particularly so. All three possess a blue or bluish fluorescence with a faint yellowish color which does not interfere with their use with other colors. Accordingly when these stabilizers are used with blue coloring materials the amount of the latter may be substantially reduced. Moreover, the addition of small amounts of these substances to colored gasoline brightens the anthraquinone coloring materials to a great extent.

The quantity of my improved stabilizing agents to be added to the gasoline may vary considerably depending upon the nature of the gasoline and upon the effects desired, but in general I find the use of from ¼ to 3 pounds of the stabilizer per ten thousand gallons of gasoline satisfactory for the purposes specified. Examples of coloring materials with which my improved stabilizers give pleasing fluorescent effects particularly with binaphthalene oxide, are as follows: Di paratoluido anthraquinone, monomethyl amido para toluido anthraquinone, 1-hydroxy 4-paratoluido anthraquinone. All these colors are of the anthraquinone group.

A specific example of a colored stabilized gasoline is the following:

Gasoline _____ 1 tank car or 10,000 gallons
1.4 para di-toluido anthraquinone _____ ¼ lb.
Bi-naphthalene oxide _____ 2 lbs.

In general, an amount on the order of ¼ lb. of stabilizer per tank car is sufficient for stabilizing purposes, whereas as much as two or three pounds may be useful in producing certain fluorescent effects.

The following series of experiments indicates the valuable nature of these substances as stabilizers in gasoline:

The procedure followed in all of the experiments was to place a sample of gasoline in a 4 oz. cylindrical bottle tightly closed and expose the said bottle to bright sunlight for a period of eight hours. Standard trade gasoline with or without tetraethyl lead was used. In all cases controls kept in the dark showed no apparent change over eight hours.

After exposure as stated the following results were observed:

1. A sample of untreated gasoline was opaque and showed a deep yellow coloration with gum deposits settled in the bottom of the bottle.

2. A sample of gasoline containing 1 lb. of binaphthalene oxide per ten thousand gallons of gasoline remained entirely clear and was not distinguishable in appearance from the control.

3. Gasoline containing 3 cc. of tetraethyl lead fluid per gallon of gasoline but otherwise untreated showed a heavy precipitate of lead compound and a total loss of red color.

4. A sample containing the same amount of tetraethyl lead fluid as specified in Example 3 and the same amount of binaphthalene oxide specified in Example 2 showed an extremely small precipitate of the lead compound and practically no loss of red color.

5. A sample of gasoline was treated with 1 lb. of binaphthalene dioxide per ten thousand gallons of gasoline and showed a slight yellow coloration. Otherwise there was no change.

6. A sample of gasoline was treated with a similar amount of tetraethyl lead fluid as in Example 3 and a similar amount of binaphthalene dioxide as in Example 5. After exposure a very slight precipitate was observed and a slight fading of the red color which was discernible only by comparison with the control.

In addition to stabilizing gasoline, my improved stabilizers are useful with other petroleum products, for example, lubricating, transformer and turbine oils to arrest the decomposition which normally takes place when these oils are used for their customary purposes.

In addition, the presence of the above-named substance of my invention in tetraethyl fluid itself has been found to increase the stability thereof. The term tetraethyl fluid is used to designate the mixture of tetraethyl lead and attendant modifying agents such as ethylene di-bromide and monochlor-naphthalene which are customarily present. For this purpose, the amount of stabilizer used may be on the order of .01 to 1%.

I claim:

1. A petroleum distillate tending to be unstable in the presence of light containing a stabilizing agent therefor comprising a small quantity of a compound selected from a group consisting of binaphthalene oxide, iso binaphthalene oxide, and binaphthalene dioxide.

2. A gasoline containing an organic metallic compound as an anti-knock ingredient, tending to be unstable in the presence of light, and a stabilizing agent therefor comprising a small quantity of a compound selected from a group consisting of binaphthalene oxide, iso binaphthalene oxide, and binaphthalene dioxide, said compound having the property of preventing precipitation of the said anti-knock ingredient on exposure to light.

3. A gasoline containing a coloring material and tending to be unstable in the presence of light and a small quantity of a stabilizing and fluorescence producing substance selected from the group consisting of binaphthalene oxide, iso binaphthalene oxide, and binaphthalene dioxide.

4. A petroleum distillate tending to be unstable in the presence of light, and containing a small quantity of binaphthalene oxide as a stabilizer.

5. A petroleum distillate tending to be unstable in the presence of light, and containing a small quantity of iso binaphthalene oxide as a stabilizer.

6. A petroleum distillate tending to be unstable in the presence of light, and containing a small quantity of binaphthalene dioxide as a stabilizer.

7. The method of stabilizing gasoline against the effect of light which consists in adding thereto a small quantity of a compound selected from the group consisting of binaphthalene oxide, iso binaphthalene oxide, and binaphthalene dioxide.

8. A gasoline containing tetraethyl fluid and a small quantity of a compound selected from the group consisting of binaphthalene oxide, iso binaphthalene oxide and binaphthalene dioxide.

JOHN W. ORELUP.

CERTIFICATE OF CORRECTION.

Patent No. 2,262,466.  November 11, 1941.

JOHN W. ORELUP.

It is hereby certified that error appears in the printed specification of the above numbered patent requiring correction as follows: Page 2, second column, line 26, for the word "to" before "1%" read --of--; and that the said Letters Patent should be read with this correction therein that the same may conform to the record of the case in the Patent Office.

Signed and sealed this 13th day of January, A. D. 1942.

(Seal)

Henry Van Arsdale,
Acting Commissioner of Patents.